United States Patent [19]
Bridges

[11] Patent Number: 5,631,427
[45] Date of Patent: May 20, 1997

[54] ACCELEROMETER-BASED SHOCK/ VIBRATION TESTING APPARATUS AND ASSOCIATED METHODS FOR A PORTABLE COMPUTER

[75] Inventor: John W. Bridges, Pflugerville, Tex.

[73] Assignee: Dell USA, L.P., Austin, Tex.

[21] Appl. No.: 587,261

[22] Filed: Jan. 16, 1996

[51] Int. Cl.$^6$ .............................. G01D 9/00; G01D 15/00
[52] U.S. Cl. .................. 73/658; 73/489; 73/491; 364/566; 340/669; 340/683
[58] Field of Search ..................... 73/658, 489, 491, 73/509, 654, 493, 514.32; 340/669, 683, 693, 429, 636, 566; 307/64, 66; 364/551.01, 566

[56] References Cited

U.S. PATENT DOCUMENTS

| | | | |
|---|---|---|---|
| Re. 35,269 | 6/1996 | Comerford | 360/75 |
| 4,745,564 | 5/1988 | Tennes et al. | 364/566 |
| 4,821,218 | 4/1989 | Potsch | 364/566 |
| 4,862,394 | 8/1989 | Thompson et al. | 364/551.01 |
| 5,144,598 | 9/1992 | Engdahl et al. | 367/181 |
| 5,363,312 | 11/1994 | Ninomiya | 364/483 |
| 5,541,860 | 7/1996 | Takei et al. | 364/566 |

Primary Examiner—Hezron E. Williams
Assistant Examiner—Richard A. Moller
Attorney, Agent, or Firm—Konneker & Smith, P.C.

[57] ABSTRACT

A portable notebook computer has a shock/vibration testing system incorporated therein and including first and second memory chips and a miniature accelerometer mounted on the computer motherboard and interconnected to the power supply board and storage battery portions of the computer by a power supply switchover circuit. During operational periods of the computer the switchover circuit connects the power supply board output to the accelerometer input, and the accelerometer output to the first memory chip, so that accelerometer output data indicative of the operational shock/vibration loads borne by the computer is received and stored in the first memory chip. During non-operational periods of the computer the switchover circuit connects the storage battery output to the accelerometer input, and the accelerometer output to the second memory chip, so that accelerometer output data indicative of the non-operational shock/vibration loads borne by the computer is received and stored in the second memory chip. After a predetermined test period the operational and non-operational shock/vibration loading data stored in the two memory chips is retrieved and analyzed by suitable diagnostic software loaded in the computer.

19 Claims, 1 Drawing Sheet

ACCELEROMETER-BASED SHOCK/ VIBRATION TESTING APPARATUS AND ASSOCIATED METHODS FOR A PORTABLE COMPUTER

BACKGROUND OF THE INVENTION

The present invention generally relates to the testing of computer apparatus and, in a preferred embodiment thereof, more particularly relates to apparatus and associated methods for determining the shock and vibration loads experienced by a computer during both operational and non-operational periods thereof.

Computers, and particularly small portable notebook computers, are typically subjected to a variety of shock and vibrational loads both under operational conditions (i.e., when the computer is being used for a computing task), and under non-operational conditions, such as when the computer is being shipped to the consumer or being transported by the consumer between computer use periods. In order for a manufacturer to properly design the computer from a ruggedness standpoint it is necessary to determine in some manner the type, magnitude and duration of the various shock and vibration loads that the computer will be subjected to, during both operational and non-operational periods, on its way to and in the hands of the consumer.

At present, the determination of these shock and vibration loads that will be later borne by a computer yet to be sent to a consumer is typically one of estimation based on simulated computer operational and non-operational mode conditions. For example, to estimate shipping loads which the computer may be subjected to on its way to a consumer, a relatively large portable accelerometer is secured to a test computer which is dropped a predetermined distance to simulate some predetermined degree of rough handling of the computer by delivery personnel. Other in-laboratory tests, using bulky shock and vibration measuring apparatus, are also typically used to approximate user-imposed shock and vibration loads that the computer might ultimately be subjected to.

As is well known, these and other shock and vibration load testing procedures provide, at best, only an approximation of the actual shock and vibrational loads that the computer will encounter. Accordingly, the accurate strength and durability evaluation of various peripheral components incorporated in the computer, such as its hard drive and floppy drive portions, is often difficult to achieve. Thus, the selection and evaluation of such peripheral components for incorporation in its product line can be a somewhat cumbersome trial and error process.

From the foregoing it can be readily seen that a need exists for improved apparatus and methods for testing the shock and vibrational loads imposed on a computer during both operational and non-operational periods thereof. It is accordingly an object of the present invention to provide such improved apparatus and methods.

SUMMARY OF THE INVENTION

In carrying out principles of the present invention, in accordance with a preferred embodiment thereof, a computer, representatively a portable notebook computer, has apparatus incorporated therein for monitoring and recording shock and vibrational loads to which the computer is subjected during both operational and non-operational periods thereof. The computer has a first power supply structure, representatively an AC-to-DC power supply board, with an output from which electrical power may be generated during operational periods of the computer, and a second power supply structure, representatively a DC storage battery, with an output from which electrical power may be generated during non-operational periods of the computer.

The monitoring and recording apparatus is powered by the first and second power supply structures and includes an accelerometer carried by the computer and operative to sense shock and vibration loads to which the computer is subjected during both operational and non-operational periods thereof. The accelerometer has an electrical power supply input and an electrical measurement signal output. First and second memory devices, representatively separate first and second memory chips mounted on the computer motherboard along with the accelerometer, are operative to receive and store shock and vibration load data for subsequent retrieval.

Switching circuitry is also provided and is operative to automatically (1) couple the accelerometer electrical power supply input to the first power supply structure output, and to couple the accelerometer electrical measurement signal output to the first memory device, during operational periods of the computer, and (2) couple the accelerometer electrical power supply input to the second power supply structure output, and to couple the accelerometer electrical measurement signal output to the second memory device, during non-operational periods of the computer.

Representatively, the switchover circuitry includes a first two-position electrical switching relay powered by the first power supply structure and operatively interconnecting the accelerometer electrical measurement signal output and the first and second memory devices, and a second two-position electrical switching relay also powered by the second power supply structure and operatively interconnecting the accelerometer power supply input, the first power supply structure output, and the second power supply structure output. Preferably, the monitoring and recording apparatus also includes diagnostic software loaded into the computer and operative to retrieve and analyze shock and vibrational load data stored in the first and second memory chips.

In carrying out a method of the present invention, during operational periods of the computer, the accelerometer is powered by the first supply structure and automatically transmits its shock and vibrational load data to the first memory device for storage therein and subsequent retrieval and analysis by the diagnostic software. When the first power supply structure is turned off, and thus during non-operational periods of the computer, the switchover circuitry automatically causes the accelerometer to be powered by the second power supply structure and transmit its shock and vibrational load data to the second memory device for storage therein and subsequent retrieval and analysis by the diagnostic software.

DETAILED DESCRIPTION

Figure 1:
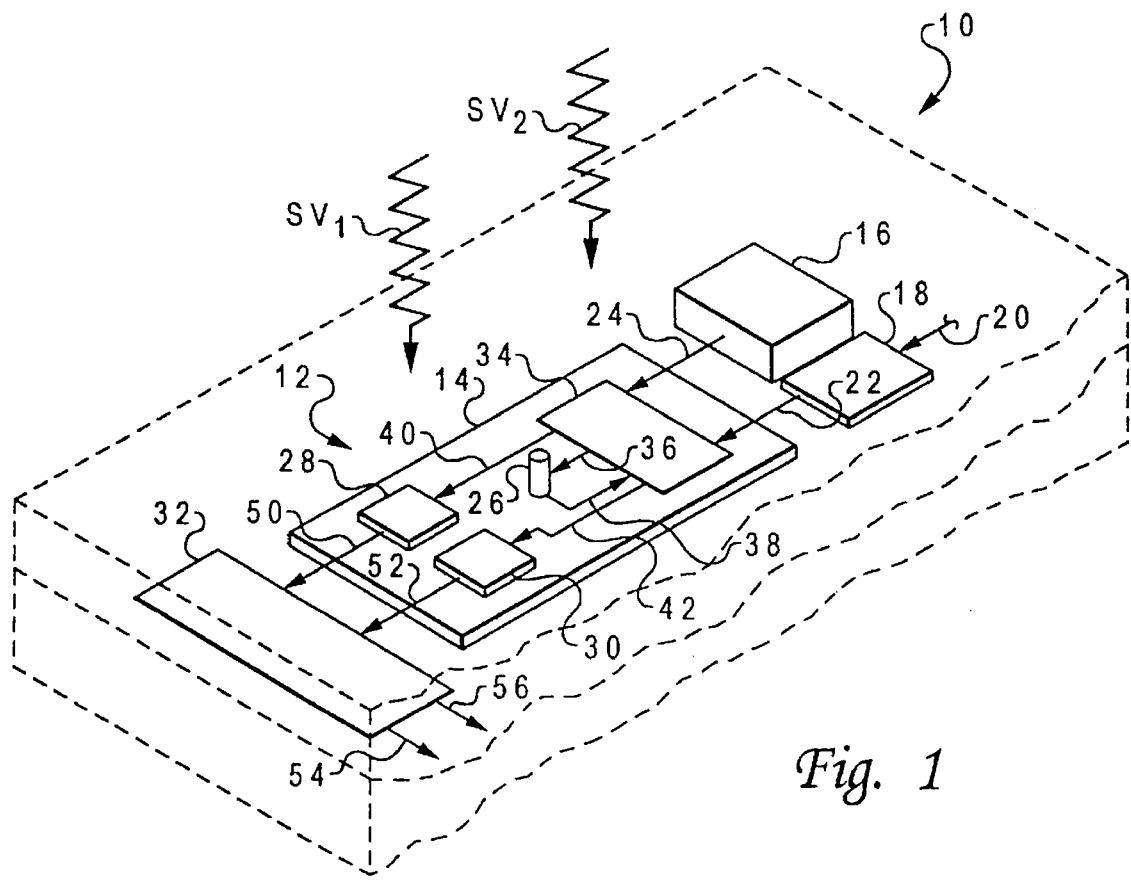
FIG. 1 is a partially phantomed, simplified perspective view of a portion of a representative notebook computer incorporating therein accelerometer-based shock/vibration testing apparatus embodying principles of the present invention.

Perspectively illustrated in partially phantomed form in FIG. 1 is a computer, representatively a portable notebook computer 10, having incorporated therein an accelerometer-based shock/vibration testing and recording system 12 embodying principles of the present invention. As will be subsequently described in greater detail herein, the system 12 uniquely functions to monitor and record (1) the shock and vibrational load $SV_1$ to which the computer is subjected during operational (i.e., "use") periods thereof, and (2) the shock and vibrational load $SV_2$ to which the computer is subjected during non-operational periods thereof such as when the computer is being shipped to or transported by the user. The recorded $SV_1/SV_2$ load data is easily retrieved from the system 12 to provide a complete operational/non-operational shock and vibration load history of the computer for the selected time period being investigated.

Operatively disposed within the interior of the computer 10 is a printed circuit board, representatively a motherboard 14, a small DC storage battery 16, and a power supply board 18. The power supply board 18, in a conventional manner, operates to receive an AC electrical power input 20 from an external source thereof, and convert it to a DC electrical power output 22 used to power various electronic components within the computer during operational periods thereof. The storage battery 16 serves to create a DC electrical power output, via lead 24, usable by various components within the computer during non-operational periods thereof.

In addition to the battery 16 and the power supply board 18, the testing system 12 includes (1) a miniature electrically powered accelerometer 26 mounted on the circuit board 14, (2) a pair of suitable memory devices, such as a pair of "flash" memory chips 28 and 30, mounted on the circuit board 14, (3) diagnostic software 32 operatively loaded into the computer, and (4) an automatic power switchover circuit 34 operatively interposed as illustrated between various of the other components of the testing system 12. Representatively, the miniature accelerometer 26 is a series 321A70 TO-5 packaged, shear-structured OEM accelerometer sold by PCB Piezotronics, Inc., 3425 Walden Avenue, Depew, N.Y. 14043.

During operational periods of the computer 10 the power supply board 18 is receiving AC electrical input 20 and responsively outputting DC power via lead 22 to the switchover circuit 34. Circuit 34 automatically blocks the transmission to the accelerometer 26 of the DC electrical output from the battery 16, via lead 24, and instead transmits the power supply board electrical output 22 to the accelerometer, to power it, via lead 36. In response to sensing the shock and vibrational load $SV_1$ imposed on the computer 10, the accelerometer 26 outputs to the circuit 34, via lead 38, an electrical signal indicative of the sensed shock and vibrational load $SV_1$. In a manner subsequently described herein, the circuit 34 responsively transmits the lead 38 signal to the memory chip 28, for storage therein for subsequent retrieval and analysis, via lead 40.

During non-operational periods of the computer 10 the switchover circuit 34 functions to permit DC battery output power, via lead 24, to be transmitted to the accelerometer 26 through lead 36. Upon sensing the non-operational shock and vibrational load $SV_2$ imposed on the computer 10 the accelerometer 26 outputs to the circuit 34, via lead 38, an electrical signal which is now indicative of the sensed shock and vibrational load $SV_2$. In a manner subsequently described herein, the circuit 34 responsively transmits the lead 38 signal to the memory chip 30, for storage therein for subsequent retrieval and analysis, via lead 42.

Figure 2:
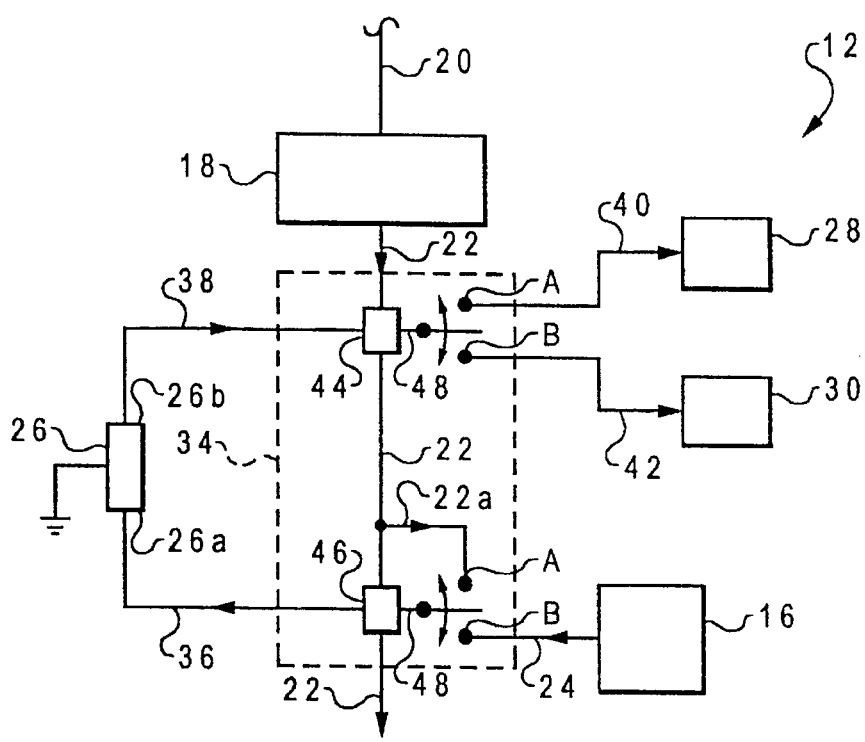
FIG. 2 is a schematic diagram illustrating in greater detail a power source switching circuit portion of the testing apparatus depicted in FIG. 1.

Turning now to FIG. 2, the switchover circuit 34 includes a pair of two-position relays 44,46 connected in the lead 22 and powered by electrical current flowing therethrough during operational periods of the computer 10. Each of the relays 44,46 has a pair of contacts A and B, and a movable switch member 48 that is automatically brought into electrically conductive engagement with contact A in response to electrical current flow through lead 22, and automatically brought into electrically conductive engagement with contact B in response to a cessation of current flow through lead 22.

Lead 36 is interconnected between the input 26a of the accelerometer 26 and the movable switch member 48 of relay 46; lead 38 is interconnected between the output 26b of the accelerometer 26 and the movable switch member 48 of the relay 44; lead 40 is interconnected between the memory chip 28 and contact A of relay 44; lead 42 is interconnected between memory chip 30 and contact B of relay 44; lead 24 is interconnected between the battery 16 and contact B of relay 46; and a branch 22b of lead 22 is connected to contact A of relay 46.

As can be seen in FIG. 2, during operational periods of the computer 10, with DC electrical current flowing through lead 22, the input 26a of the accelerometer 26 is coupled to, and thus powered by, the power supply board 18 sequentially via lead 22, branch lead 22a, contact A of relay 46, switch portion 48 of relay 46, and lead 36. Additionally, the output 26b of accelerometer 26 is coupled to the memory chip 28 sequentially via the lead 38, switch portion 48 of relay 44, contact A of relay 44, and lead 40.

As can also be seen in FIG. 2, during non-operational periods of the computer 10, with the flow of DC electrical current through lead 22 having been terminated, the input 26a of the accelerometer 26 is coupled to, and thus powered by, the battery 16 sequentially via lead 24, contact B of relay 46, switch portion 48 of relay 46, and lead 36. Additionally, the output 26b of accelerometer 26 is coupled to the memory chip 30 sequentially via the lead 38, switch portion 48 of relay 44, contact B of relay 44, and lead 42.

Returning now to FIG. 1, after a predetermined test period in which the computer 10 has experienced a variety of operational and non-operational shock/vibration loads $SV_1$ and $SV_2$, the stored shock/vibration load data in the memory devices 28, 30 may be retrieved, analyzed and outputted by the diagnostic software 32, as indicated by the arrows 50, 52 and 54, 56 in FIG. 1. In this manner, the shock and vibration loading on the computer during both use and non-use periods (including shipping of the computer to a consumer) may be accurately and unobtrusively monitored and recorded without the use of any bulky test equipment under actual "field" conditions.

By retrieving this conveniently stored information, for example when the computer is brought in for service, the computer manufacturer is provided with a basis for an actual operating environment evaluation of peripheral devices incorporated into the computer (for example its hard and floppy drive portions). As will be readily appreciated, the use by the manufacturer of the diagnostic program readouts 54, 56 also conveniently permits the manufacturer to closely duplicate in the laboratory the operational and non-operational shock/vibration load patterns that the computer is typically subjected to in the field.

The foregoing detailed description is to be clearly understood as being given by way of illustration and example only, the spirit and scope of the present invention being limited solely by the appended claims.

What is claimed is:

1. Computer apparatus comprising:
a computer having a first power supply structure with an output from which electrical power from said first power supply structure may be transmitted during operational periods of the computer, and a second power supply structure with an output from which electrical power from said second power supply structure may be transmitted during non-operational periods of the computer;
an accelerometer carried by said computer and operative to sense shock and vibration loads to which said computer is subjected during said operational and non-operational periods thereof, said accelerometer having an electrical power supply input and an electrical measurement signal output;
first and second memory means carried by said computer and operative to separately receive and store shock and vibration load data for subsequent retrieval; and
switchover circuitry operative to automatically:
  (1) couple said first power supply structure output to said accelerometer electrical power supply input, and to couple said accelerometer electrical measurement signal output to said first memory means, during said operational periods of said computer, and
  (2) couple said second power supply structure to said accelerometer electrical power supply input, and to couple said accelerometer electrical measurement signal output to said second memory means, during said non-operational periods of said computer.

2. The computer apparatus of claim 1 wherein said computer is a notebook computer.

3. The computer apparatus of claim 1 wherein:
said computer further has a circuit board therein, and
said accelerometer and said first and second memory means are operatively mounted on said circuit board.

4. The computer apparatus of claim 3 wherein:
said first and second memory means are separate memory chips.

5. The computer apparatus of claim 3 wherein:
said circuit board is a computer system motherboard.

6. The computer apparatus of claim 1 wherein:
said first power supply structure is a power supply board operative, during said operational periods of said computer, to receive AC electrical power from a source thereof and responsively transmit DC electrical power from said output of said first power supply structure, and
said second power supply structure is a DC storage battery.

7. The computer apparatus of claim 1 further comprising:
diagnostic software loaded into said computer and operative to retrieve and analyze shock and vibrational load data stored in said first and second memory means.

8. The computer apparatus of claim 1 wherein said switchover circuitry includes:
a first two-position electrical switching relay powered by said first power supply structure and operatively interconnecting said accelerometer electrical measurement signal output and said first and second memory means, and
a second two-position electrical switching relay powered by said first power supply structure and operatively interconnecting said accelerometer power supply input, said first power supply structure output, and said second power supply structure output.

9. For use in conjunction with a computer having first and second power supply structures with outputs from which electrical power may be transmitted respectively during operational and non-operational periods of the computer, a method of determining the shock and vibration loading to which the computer is subjected during such operational and non-operational periods, said method comprising the steps of:
positioning an accelerometer and first and second memory means in the computer;
electrically powering said accelerometer using the first power supply structure, and enabling said accelerometer to transmit sensed shock/vibration load data to said first memory means for storage therein, in response to transmission of electrical power from said output of said first power supply structure; and
electrically powering said accelerometer using the second power supply structure, and enabling said accelerometer to transmit sensed shock/vibration load data to said second memory means for storage therein, in response to cessation of transmission of electrical power from said output of said first power supply structure.

10. The method of claim 9 wherein:
the computer has a circuit board therein, and
said positioning step is performed by operatively mounting said accelerometer, and said first and second memory means, on said circuit board.

11. The method of claim 10 wherein:
the computer has a system motherboard therein, and
said positioning step includes the step of operatively mounting said accelerometer, and first and second separate memory chips, on said system motherboard.

12. The method of claim 9 wherein said accelerometer has an electrical power supply input and an electrical measurement signal output, and said electrically powering and enabling steps include the steps of:
connecting the electrical power inputs of first and second electrical switching relays to said first power supply structure,
using said first relay to operatively couple said electrical measurement signal output of said accelerometer to a selectively variable one of said first and second memory means, and
using said second relay to operatively couple the output of a selectively variable one of said first and second power supply structures to said power supply input of said accelerometer.

13. The method of claim 9 further comprising the step of:
retrieving and analyzing shock and vibrational load data generated by said accelerometer and stored in said first and second memory means.

14. The method of claim 13 wherein:
said retrieving and analyzing step is performed using a diagnostic software program installed in said computer and operatively coupled to said first and second memory devices.

15. Computer apparatus comprising:
a computer having disposed therein a circuit board, an AC-to-DC power board with an output from which electrical power may be generated during operational periods of the computer, and a DC storage battery with an output from which electrical power may be generated during non-operational periods of the computer;
an accelerometer mounted on said circuit board and operative to sense shock and vibration loads to which said computer is subjected during said operational and non-operational periods thereof, said accelerometer having an electrical power supply input and an electrical measurement signal output;

first and second memory chips mounted on said circuit board and operative to receive and store shock and vibration load data for subsequent retrieval; and switchover circuitry operative to automatically:
(1) couple said power supply board output to said accelerometer electrical power supply input, and to couple said accelerometer electrical measurement signal output to said first memory chip, during said operational periods of said computer, and
(2) couple said DC storage battery output to said accelerometer electrical power supply input, and to couple said accelerometer electrical measurement signal output to said second memory chip, during said non-operational periods of said computer, said switchover circuitry including:
 a first two-position electrical switching relay powered by said power supply board and operatively interconnecting said accelerometer electrical measurement signal output and said first and second memory chips, and
 a second two-position electrical switching relay powered by said power supply board and operatively interconnecting said accelerometer power supply input, said power supply board, and said DC storage battery.

16. The computer apparatus of claim 15 wherein:
said computer is a portable computer.

17. The computer apparatus of claim 16 wherein:
said portable computer is a notebook computer.

18. The computer apparatus of claim 15 wherein:
said circuit board is a system motherboard.

19. The computer apparatus of claim 15 further comprising:
diagnostic software loaded into said computer and operative to retrieve and analyze shock and vibrational data stored in said first and second memory chips.

* * * * *